United States Patent
Leal et al.

(10) Patent No.: US 10,357,861 B2
(45) Date of Patent: Jul. 23, 2019

(54) MAGNETIC SAMPLE HOLDER FOR ABRASIVE OPERATIONS AND RELATED METHODS

(71) Applicant: Baker Hughes, a GE company, LLC, Houston, TX (US)

(72) Inventors: Jair Leal, Houston, TX (US); Marc W. Bird, Houston, TX (US); James L. Overstreet, Tomball, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 85 days.

(21) Appl. No.: 15/362,393

(22) Filed: Nov. 28, 2016

(65) Prior Publication Data

US 2018/0147679 A1    May 31, 2018

(51) Int. Cl.
| | | |
|---|---|---|
| *B23Q 3/154* | (2006.01) | |
| *B24B 41/06* | (2012.01) | |
| *B24B 37/10* | (2012.01) | |
| *B24B 37/24* | (2012.01) | |
| *B24D 18/00* | (2006.01) | |
| *B24D 99/00* | (2010.01) | |

(52) U.S. Cl.
CPC ......... *B23Q 3/1546* (2013.01); *B23Q 3/1543* (2013.01); *B24B 37/10* (2013.01); *B24B 37/245* (2013.01); *B24B 41/06* (2013.01); *B24D 18/0009* (2013.01); *B24D 99/005* (2013.01)

(58) Field of Classification Search
None
See application file for complete search history.

(56) References Cited

U.S. PATENT DOCUMENTS

| | | | |
|---|---|---|---|
| 2,059,745 A * | 11/1936 | Reis | H02K 1/2706 310/156.63 |
| 2,179,625 A | 11/1939 | Groden | |
| 2,618,108 A | 11/1952 | Richardson | |

(Continued)

FOREIGN PATENT DOCUMENTS

WO     2004112091 A2    12/2004

OTHER PUBLICATIONS

Allied High Tech, Excellence in Sectioning, www.alliedhightech.com, visited Oct. 20, 2016, 3 pages.

(Continued)

*Primary Examiner* — Kevin M Bernatz
(74) *Attorney, Agent, or Firm* — TraskBritt

(57) ABSTRACT

Magnetic sample holders for abrasive operations include an array of magnets embedded in a matrix material. Each magnet of the array is positioned between about 0 mm and about 4 mm from at least one adjacent magnet of the array. Exposed surfaces of the magnets of the array are coplanar with a planar working surface of the matrix material. Methods of forming a polycrystalline diamond compact element include magnetically securing an alloy sample to an array of magnets embedded in a matrix. Each of the magnets of the array is within about 4 mm of at least one adjacent magnet of the array. A portion of the alloy sample is abraded away, and the alloy sample is positioned proximate to diamond grains and a substrate. The alloy sample, diamond grains, and substrate are subjected to a high pressure/high temperature process to sinter the diamond grains.

19 Claims, 5 Drawing Sheets

(56) References Cited

U.S. PATENT DOCUMENTS

| | | | | |
|---|---|---|---|---|
| 3,296,571 | A * | 1/1967 | Fisher | B23Q 3/154 335/286 |
| 3,336,551 | A * | 8/1967 | Stead | B23Q 3/1546 269/8 |
| 3,377,495 | A * | 4/1968 | Aine | H01J 41/20 313/161 |
| 3,775,717 | A * | 11/1973 | Braillon | B23Q 3/1546 335/295 |
| 4,222,204 | A * | 9/1980 | Benner | B24D 9/085 15/230 |
| 4,599,826 | A * | 7/1986 | Podoprigora | B24B 1/005 335/306 |
| 4,652,845 | A * | 3/1987 | Finkle | B23Q 3/1546 294/65.5 |
| 5,291,692 | A | 3/1994 | Takahashi et al. | |
| 6,224,474 | B1 | 5/2001 | Vander Voort | |
| 6,245,006 | B1 | 6/2001 | Olson | |
| 6,852,007 | B1 | 2/2005 | Gonzalez-Martin et al. | |
| 7,377,836 | B1 * | 5/2008 | Molnar | B24B 37/013 205/640 |
| 9,470,712 | B1 | 10/2016 | Kane et al. | |
| 9,500,983 | B2 | 11/2016 | Tanaka et al. | |
| 9,501,882 | B2 | 11/2016 | Saravanan | |
| 2009/0027149 | A1 * | 1/2009 | Kocijan | B25B 11/002 335/288 |
| 2009/0178345 | A1 | 7/2009 | Russell et al. | |
| 2011/0204024 | A1 | 8/2011 | Moriya | |
| 2012/0256715 | A1 * | 10/2012 | Fullerton | H01F 7/021 335/285 |
| 2015/0183083 | A1 | 7/2015 | Cook | |
| 2015/0306727 | A1 | 10/2015 | Otsuki et al. | |
| 2016/0003269 | A1 * | 1/2016 | Russell-Clarke | A41F 1/002 24/303 |

OTHER PUBLICATIONS

Bird et al., U.S. Appl. No. 15/060,911, titled Polycrystalline Diamond Compacts, Methods of Forming Polycrystalline Diamond, and Earth-Boring Tools, filed Mar. 4, 2016.

Buehler, Solutions for Materials Preparation, Testing and Analysis, https://www.buehler.com, visited Oct. 20, 2016, 13 pages.

Dunn et al., Metrology for Characterization of Wafer Thickness Uniformity During 3D-IC Processing, Conference Paper in Proceedings—Electronic Components and Technology Conference—May 2012, 6 pages.

Eclipse Magnetics, Magnetic Liftng & Handling Systems, Safe & Efficient Handling for Manufacturing and Assemgly Lines, http://www.eclipsemagnetics.com/media/wysiwyg/brochures/Handling-application-overview-brochure_lr.pdf, visited Oct. 20, 2016, 24 pages.

LABX, New and Used Laboratory Equipment for Sale, Auctions, Wanted, http://www.labx.com, visited Oct. 20, 2016, 4 pages.

Makepole, PPM Rainbow Ming Industrial Co. Ltd., http://1041752.en.makepolo.com/products/Sintered-Soft-Magnetic-Holder-PortsCoil-RingPowder-Metallurgy-with-Good-Magnetic-Properties-p38023255.html, visited Oct. 20, 2016, 2 pages.

Metallographic, Products for Metallography, http://www.metallographic.com/index-home.htm, visited Oct. 20, 2016, 2 pages.

Metallographic Equipment, Sample Preparation, Sectioning, Mounting Grinding, Poolishing, Machines, http://metallographicequipment.com, visited Oct. 20, 2016, 2 pages.

Qualitest, WorldofTest.com, Qualitest—Advanced Testing Technologies, htt'://www.worldoftest.com, visted Oct. 20, 2016, 4 pages.

International Search Report for International Application No. PCT/US2017/063254 dated Feb. 13, 2018, 3 pages.

International Written Opinion for International Application No. PCT/US2017/063254 dated Feb. 13, 2018, 11 pages.

* cited by examiner

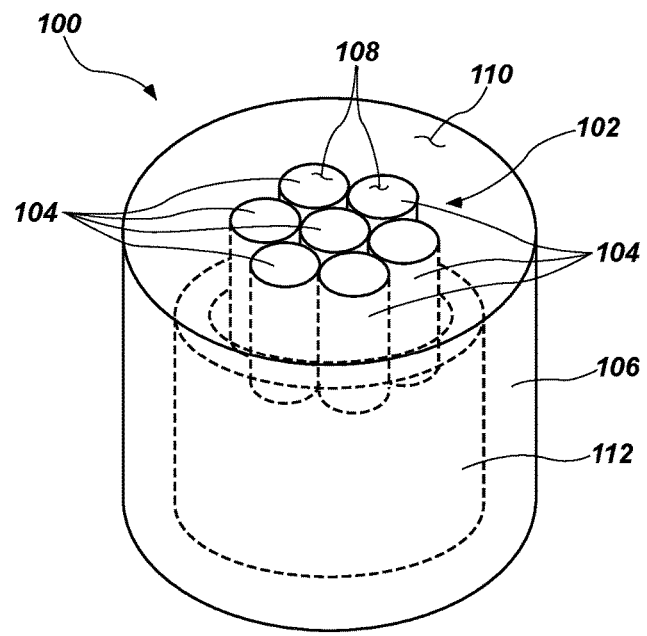
FIG. 1
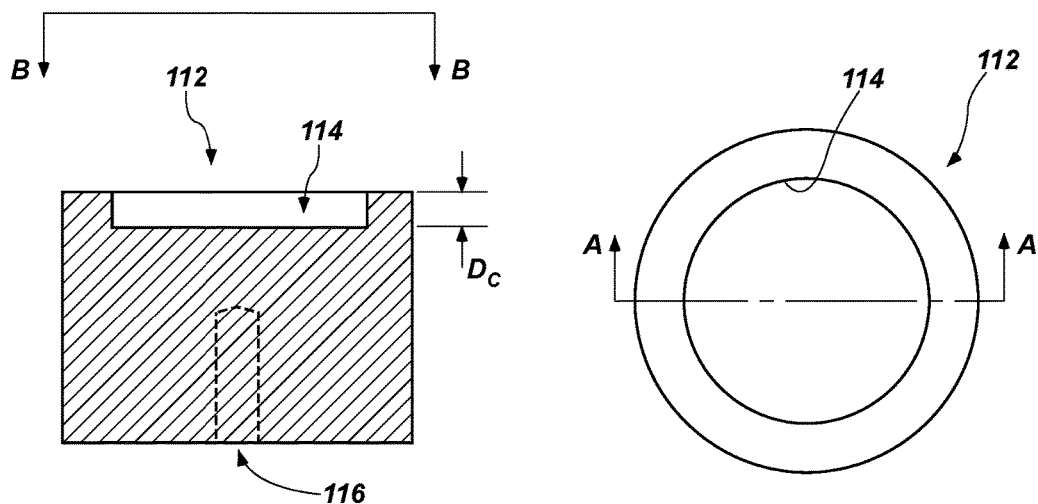
FIG. 2A     FIG. 2B

MAGNETIC SAMPLE HOLDER FOR ABRASIVE OPERATIONS AND RELATED METHODS

FIELD

Embodiments of the present disclosure relate to sample holders for holding a sample to be abraded (e.g., polished or ground), and to related methods of abrading samples. Some embodiments relate to holders and methods for forming thin bodies, such as thin alloy disks used in the formation of polycrystalline diamond compacts.

BACKGROUND

Earth-boring tools for forming wellbores in subterranean earth formations may include a plurality of cutting elements secured to a body. For example, fixed-cutter earth-boring rotary drill bits (also referred to as "drag bits") include a plurality of cutting elements that are fixedly attached to a bit body of the drill bit. Similarly, roller-cone earth-boring rotary drill bits include cones that are mounted on bearing pins extending from legs of a bit body such that each cone is capable of rotating about the bearing pin on which the cone is mounted. A plurality of cutting elements may be mounted to each cone of the drill bit.

The cutting elements used in earth-boring tools often include polycrystalline diamond compact (often referred to as "PDC") cutters, which are cutting elements that include a polycrystalline diamond (PCD) material. Such polycrystalline diamond cutting elements are formed by sintering and bonding together relatively small diamond grains or crystals under conditions of high pressure and high temperature, conventionally in the presence of a catalyst (such as cobalt, iron, nickel, or alloys and mixtures thereof), to form a layer of polycrystalline diamond material on a cutting element substrate. These processes are often referred to as high pressure/high temperature (or "HPHT") processes, which may take place at a pressure of about 5.5 to about 7.2 GPa and at a temperature of about 1200° C. to about 2200° C. Catalyst material is conventionally mixed with the diamond grains to reduce the amount of oxidation of diamond by oxygen and carbon dioxide during an HPHT process and to promote diamond-to-diamond bonding.

The cutting element substrate may include a cermet material (i.e., a ceramic-metal composite material) such as cobalt-cemented tungsten carbide. In such instances, the cobalt (or other catalyst material) in the cutting element substrate may be drawn into the diamond grains or crystals during sintering and serve as a catalyst material for forming a diamond table from the diamond grains or crystals. In other methods, powdered catalyst material may be mixed with the diamond grains or crystals prior to sintering the grains or crystals together in an HPHT process. In additional methods, thin bodies (e.g., foils, disks) of the catalyst elements are stacked adjacent to the diamond grains for infusion into the spaces between the diamond grains during HPHT processing. Cutting elements formed by using such thin bodies often results in a non-homogenized (e.g., non-uniform) distribution of the catalyst elements throughout the resulting diamond table.

Upon formation of a diamond table using an HPHT process, catalyst material may remain in interstitial spaces between the grains or crystals of diamond in the resulting polycrystalline diamond table. The presence of the catalyst material in the diamond table may contribute to thermal damage in the diamond table when the cutting element is heated during use, due to friction at the contact point between the cutting element and the formation.

Conventional PDC formation relies on the catalyst alloy, which sweeps through the compacted diamond feed during HPHT synthesis. Traditional catalyst alloys are cobalt-based with varying amounts of nickel, tungsten, and chromium to facilitate diamond intergrowth between the compacted diamond material. However, in addition to facilitating the formation of diamond-to-diamond bonds during HPHT sintering, these alloys also facilitate the formation of graphite from diamond during drilling. Formation of graphite can rupture diamond necking regions (i.e., grain boundaries) due to an approximate 57% volumetric expansion during the transformation. This phase transformation is known as "back-conversion" or "graphitization," and typically occurs at temperatures approaching 600° C. to 1,000° C., which temperatures may be experienced at the portions of the PDC contacting a subterranean formation during drilling applications. This mechanism, coupled with mismatch of the coefficients of thermal expansion of the metallic phase and diamond, is believed to account for a significant part of the failure of conventional PDC cutters to meet general performance criteria known as "thermal stability."

To reduce problems associated with different rates of thermal expansion and with back-conversion in polycrystalline diamond cutting elements, so-called "thermally stable" polycrystalline diamond (TSP) cutting elements have been developed. A TSP cutting element may be formed by leaching the catalyst material (e.g., cobalt) out from interstitial spaces between the diamond grains in the diamond table using, for example, an acid. Substantially all of the catalyst material may be removed from the entire diamond table, or from only a portion of the diamond table, for example the cutting face, and in some instances from a portion of the sidewall of the diamond table. TSP cutting elements in which substantially all catalyst material has been leached from the diamond table have been reported to be thermally stable up to temperatures of about 1,200° C.

BRIEF SUMMARY

In some embodiments, the present disclosure includes magnetic sample holders for abrasive operations. The magnetic sample holder includes an array of magnets, each of which is positioned between about 0 mm and about 4 mm from at least one adjacent magnet of the array. The array of magnets is embedded in a matrix material. Exposed surfaces of the magnets in the array are coplanar with a planar working surface of the matrix material.

In some embodiments, the present disclosure includes magnetic sample holders that include a base structure, an array of magnets positioned over the base structure, and a matrix material in which the array of magnets is embedded. The base structure includes a non-magnetic material and has a first density. Each of the magnets of the array is cylindrical, is positioned within about 4 mm of at least two adjacent magnets of the array, and has magnetic flux lines that are parallel to magnetic flux lines of all other magnets of the array. The matrix material includes a non-magnetic and non-ferromagnetic material having a second density less than the first density. Exposed surfaces of the magnets of the array are substantially coplanar with a planar working surface of the matrix material.

In some embodiments, the present disclosure includes methods of forming a polycrystalline diamond compact element. In accordance with such methods, an alloy sample is magnetically secured to an array of magnets embedded in a matrix material. Each magnet of the array is within about 4 mm of at least one adjacent magnet of the array of magnets. A portion of the alloy sample is abraded away while being held with the array of magnets embedded in the matrix material. The alloy sample is decoupled from the array of magnets. The alloy sample is positioned proximate diamond grains and a substrate and subjected to a high pressure/high temperature process to sinter the diamond grains.

BRIEF DESCRIPTION OF THE DRAWINGS

FIG. 1 shows a perspective view of a magnetic sample holder according to an embodiment of the present disclosure.

FIG. 2A shows a cross-sectional side view of a base structure of the magnetic sample holder of FIG. 1, the cross-section taken from line A-A of FIG. 2B.

FIG. 2B shows a top view of the base structure of FIG. 2A, taken from line B-B of FIG. 2A.

DETAILED DESCRIPTION

Figure 3:
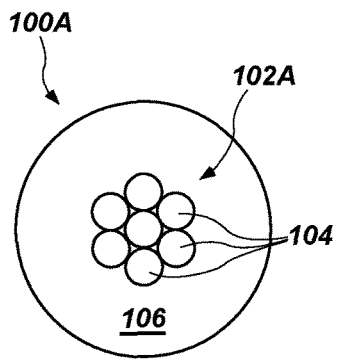
FIG. 3 shows a top view of a magnetic sample holder according to an embodiment of the present disclosure.

The following description provides specific details, such as material types, material thicknesses, and configurations of elements in order to provide a thorough description of embodiments of the present disclosure. However, a person of ordinary skill in the art will understand that the embodiments of the present disclosure may be practiced without employing these specific details. Indeed, the embodiments of the present disclosure may be practiced in conjunction with conventional techniques and materials employed in the industry.

In the following detailed description, reference is made to the accompanying drawings, which form a part hereof, and in which is shown, by way of illustration, specific embodiments in which the present disclosure may be practiced. These embodiments are described in sufficient detail to enable a person of ordinary skill in the art to practice the present disclosure. However, other embodiments may be utilized, and changes may be made without departing from the scope of the disclosure. The illustrations presented herein are not meant to be actual views of any particular system, device, structure, or process, but are idealized representations that are employed to describe the embodiments of the present disclosure. The drawings presented herein are not necessarily drawn to scale. The drawings may use like reference numerals to identify like elements. A letter after a reference numeral, such as "10A," indicates that the text refers specifically to the element having that particular reference numeral. A reference numeral in the text without a following letter, such as "10," may refer to any or all of the elements in the drawings bearing that reference numeral (e.g., "10" in the text may refer to reference numerals "10," "10A," and/or "10B" in the drawings).

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used herein, any relational term, such as "first," "second," "over," "top," etc., is used for clarity and convenience in understanding the disclosure and accompanying drawings and does not connote or depend on any specific preference, orientation, or order, except where the context clearly indicates otherwise. For example, the term "top" is sometimes used in the specification to reflect a view or orientation of the holder as shown in the drawings, but such a "top" of the holder may be positioned in a downward orientation when used in an abrasive process.

The embodiments of the present disclosure include magnetic sample holders for holding a ferromagnetic sample (e.g., alloy disk sample) to be abraded (e.g., polished or ground), and to related methods of abrading such samples. In some embodiments, the magnetic sample holders of the present disclosure may include an array of magnets (e.g., permanent magnets, electromagnets) embedded within a non-magnetic and non-ferromagnetic matrix material. Exposed surfaces of the array of magnets may be substantially coplanar with a planar face surface of the matrix material.

An embodiment of a magnetic sample holder 100 (also referred to herein as "sample holder") is illustrated in FIG. 1. The sample holder 100 includes an array 102 of magnets 104 that are embedded within a matrix material 106. As shown in FIG. 1, the sample holder 100 may be cylindrical in shape. In additional embodiments, the sample holder 100 may be in the shape of a cube, cuboid, hexagonal prism, triangular prism, or irregular prism, for example.

By way of example and not limitation, the magnets 104 of the array 102 may be cylindrical in shape, and may be arranged proximate and parallel to each other to form the array 102. The magnets 104 may each have poles aligned with a central longitudinal axis thereof, such that the magnetic flux lines run parallel to each other. Exposed end surfaces 108 of the magnets 104 may be substantially coplanar with a planar working surface 110 of the matrix material 106 for substantially uniformly supporting a sample to be held by the magnetic sample holder 100.

Each of the magnets 104 of the array 102 may be a permanent magnet or an electromagnet. In the case of permanent magnets, the magnets 104 may include, for example, a rare-earth magnet (e.g., neodymium iron boron, samarium cobalt, etc.), or a composite magnet (e.g., ceramic, alnico (a combination of aluminum, nickel, and cobalt), etc.). Electromagnets are described below with reference to FIG. 13. The type and magnetic strength of the magnets 104 may be selected and tailored depending on the sample to be held by the sample holder 100 and processing parameters. For example, if a particular sample is to be ground or polished to a relatively thin thickness, then a lower magnetic strength may be selected to enable removal of the thin sample without tearing or breaking the sample. Conversely, if a relatively thick sample is to be formed, then magnets 104 having a higher magnetic strength may be selected to retain the sample in position relative to the sample holder 100 during processing. Similarly, brittleness, chemical compatibility, material, magnetic behavior, and other properties of the sample to be held by the sample holder 100 may be factors in selecting a type and magnetic strength of the magnets 104.

As shown in FIG. 1, the array 102 may include multiple (e.g., more than one) magnets 104. Providing multiple magnets 104 may facilitate centering a sample on the array 102 by controlling and centering a magnetic field resulting from the array 102 of magnets 104. Centering a sample on the array 102 of magnets 104 may result in improved uniformity of force applied to the sample during processing (e.g., an abrasive process), which may result in improved total thickness variation ("TTV", defined as a difference between a maximum thickness and a minimum thickness of the sample) and flatness. For example, conventional processes for abrading thin films may be capable of achieving a relative flatness of greater than or equal to 0.002 inch defined as a distance between two parallel planes that encompass imperfections (e.g., valleys, ridges, etc.) in a surface. On the other hand, embodiments of the present disclosure may be capable of achieving a relative flatness of about 0.000013 inch (13 µin.), when used in conjunction with certain abrasive techniques, such as a loose abrasive polishing methods (e.g., polishing with loose abrasive diamond material) or diamond lapping films known to one of ordinary skill in the art.

The matrix material 106 may be a non-magnetic and non-ferromagnetic material. By way of example, the matrix material 106 may be a polymer (e.g., a thermoset polymer, BAKELITE® (polyoxybenzylmethyleneglycolanhydride)), a non-ferromagnetic metal (e.g., stainless steel, aluminum, etc.), a ceramic (e.g., silicon carbide, boron carbide, etc.), or a cemented carbide.

Optionally, the magnetic sample holder 100 may also include a base structure 112. The base structure 112 may be embedded within the matrix material 106 (as shown in FIG. 1). Alternatively, the matrix material 106 may be coupled to (e.g., adhered to, molded to, threaded to, etc.) the base structure 112. The base structure 112 may add mass and strength to the sample holder 100, and/or may also be used in the process of fabrication of the sample holder 100. The base structure 112 may be formed of a non-magnetic material, such as a polymer (e.g., a thermoset polymer, BAKELITE® (polyoxybenzylmethyleneglycolanhydride)), a metal (e.g., stainless steel, aluminum, etc.), or a ceramic (e.g., silicon carbide, boron carbide, etc.). In some embodiments, the base structure 112 may be a non-ferromagnetic metal, although the disclosure is not so limited. By way of example and not limitation, to add mass to the sample holder 100 for providing additional gravitational force on a sample during an abrasion process, the base structure 112 may have a density that is higher than a density of the matrix material 106.

Referring to FIGS. 1, 2A, and 2B, in some embodiments, the base structure 112 may be cylindrical with a cavity 114 in one end thereof, in which a lower portion of the magnets 104 may be positioned. The cavity 114 may be sized and configured for positioning an end of the magnets 104 therein. By way of example and not limitation, in the case of magnets 104 that have a diameter of 0.25 inch and a length of 0.5 inch, the cavity 114 may have a depth $D_C$ of about 0.125 inch.

In some embodiments, the base structure 112 may be used in the fabrication process of the sample holder 100. For example, the base structure 112 may be pre-formed and the array 102 of magnets 104 may be positioned within the cavity 114. The matrix material 106 may be molded at least partially around the base structure 112 and magnets 104 or, alternatively, may be molded at least partially around the magnets and over a top of the base structure 112. In some embodiments, the matrix material 106 may first be molded at least partially around the magnets 104, and then the combined matrix material 106 and magnets 104 may be coupled to (e.g., adhered to, mechanically coupled to, press-fit to, molded to, etc.) the base structure 112.

Optionally, as shown in FIG. 2A, the base structure 112 may include a hole 116 on an opposing side of the base structure 112 from the cavity 114. The hole 116 may be a blind hole (e.g., a threaded blind hole) for use in coupling the sample holder 100 to a support apparatus. For example, in some embodiments, in use, the sample holder 100 may be supported by a robotic arm screwed to the sample holder 100 using the hole 116, such as the robotic arm described in U.S. Pat. No. 6,852,007, titled "Robotic Method of Transferring Workpieces to and from Workstations," issued on Feb. 8, 2005, the disclosure of which is incorporated herein by reference. The robotic arm may move the sample holder 100 to magnetically pick up and hold a sample, and then may move the sample holder 100 over an abrasive pad or slurry for abrading (e.g., polishing, grinding, etc.) the sample. When the abrasive process is complete, the robotic arm may move the sample holder 100 and processed sample away from the abrasive pad or slurry for removal and further processing. Alternatively, the base structure 112 or the matrix material 106 may include external threads or another coupling feature (e.g., groove, depression, clip, etc.) to be held by a robotic arm or other support apparatus for processing.

The array 102 of magnets 104 may have one of a number of configurations. For example, as shown in FIG. 3, an array 102A of a magnetic sample holder 100A may include magnets 104 that are positioned in a hexagonal close-packed arrangement, with the individual magnets 104 of the array 102A touching each other. For instance, each magnet 104 may touch at least one other magnet 104 of the array 102A, such as at least two other magnets 104 or at least three other magnets 104. In some embodiments, the array 102A may include seven magnets 104 including a central magnet 104 surrounded six peripheral magnets 104, as shown in FIG. 3.

Optionally, the central magnet 104 may be replaced by a magnetic or non-magnetic push rod. Such a push rod could be used for facilitating lifting and removal of a sample that is magnetically coupled to the array 102A. The push rod may be slidably received within a bore extending through the matrix material 106 and/or the base structure 112 (FIGS. 2A and 2B) for being pushed outward from the planar working surface 110 (FIG. 1) when it is desired to decouple a sample from the magnetic sample holder 100A.

Figure 4:
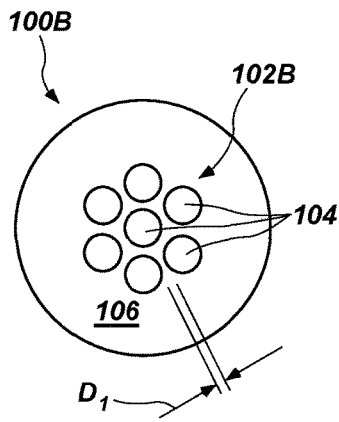
FIG. 4 shows a top view of a magnetic sample holder according to another embodiment of the present disclosure.

Referring to FIG. 4, the magnets 104 of an array 102B of a magnetic sample holder 100B may be proximate to, but spaced apart from, each other. For example, each of the magnets 104 of the array 102B may be positioned a distance $D_1$ between about 0 mm (e.g., the magnets 104 touching) and about 4 mm from at least one adjacent magnet 104 of the array 102B. By way of example and not limitation, each of the magnets 104 of the array 102B may be positioned a distance $D_1$ within about 2 mm or less or within about 1 mm or less from at least one adjacent magnet 104 of the array 102B.

Positioning the magnets 104 proximate to each other, as described above, may provide benefits when the sample holder 100 is in use. For example, the closely positioned magnets 104 may provide a more uniform magnetic force to a sample to be held by the sample holder 100, compared to magnets positioned farther apart from each other. The uniform magnetic force may reduce a TTV of the sample, and may reduce a likelihood that debris (e.g., abrasive slurry, abraded particles) become lodged between the sample and the sample holder 100.

Figure 5:
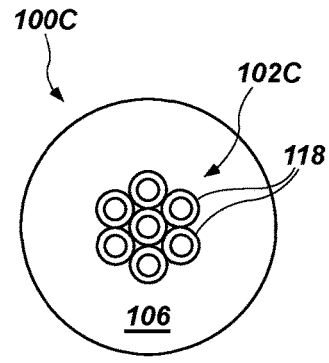
FIG. 5 shows a top view of a magnetic sample holder according to yet another embodiment of the present disclosure.

Referring to FIG. 5, a sample holder 100C, in some embodiments may be similar to the sample holder 100A of FIG. 3, except that the sample holder 100C may include an array 102C of hollow cylindrical magnets 118 rather than solid cylindrical magnets 104. Providing hollow cylindrical magnets may alter (e.g., reduce) a magnetic strength of the array 102C for tailoring a force by which a sample is held by the sample holder 100C. Thus, the present disclosure is not limited to magnets 104 that have a solid cylindrical configuration. Rather, the present disclosure also includes sample holders 100C that include hollow cylindrical magnets 118 or hollow or solid magnets of other configurations and shapes (e.g., cuboid, hexagonal prism, triangular prism, irregular prism).

Figure 6:
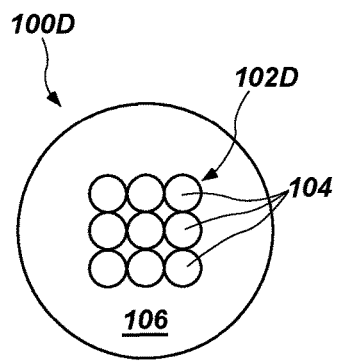
FIG. 6 shows a top view of a magnetic sample holder according to a further embodiment of the present disclosure.

Referring to FIG. 6, a sample holder 100D according to the present disclosure may include an array 102D of magnets 104 that are positioned in a square-packed arrangement. Accordingly, the present disclosure is not limited to a particular arrangement of the magnets 104.

Figure 7:
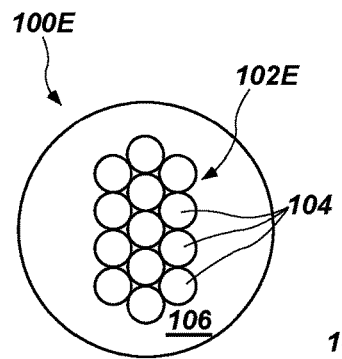
FIG. 7 shows a top view of a magnetic sample holder according to another embodiment of the present disclosure.

FIG. 7 illustrates a sample holder 100E that includes an elongated array 102E of hexagonal close-packed magnets 104. The elongated array 102E may be provided to correspond to a shape and size of a sample to be held by the sample holder 100E.

Figure 8:
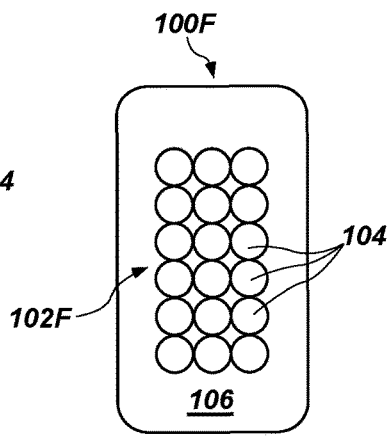
FIG. 8 shows a top view of a magnetic sample holder according to an additional embodiment of the present disclosure.

Referring to FIG. 8, a sample holder 100F may include an elongated array 102F of square-packed magnets 104. In addition, FIG. 8 illustrates that the matrix material 106 may have a shape other than cylindrical, such as substantially cuboid. The different shape of the matrix material 106 may be provided to accommodate a different shaped (e.g., elongated) array 102F, or to facilitate handling during processing (e.g., manually or with a machine).

Figure 9:
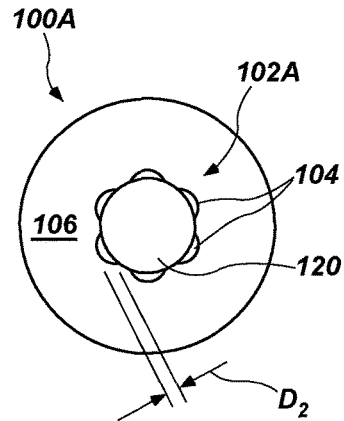
FIG. 9 shows a top view of the magnetic sample holder of FIG. 3 with a sample to be processed.

FIG. 9 illustrates the magnetic sample holder 100A of FIG. 3 with a circular alloy sample 120 (e.g., a homogenized alloy sample) magnetically coupled to the hexagonal close-packed array 102A of magnets 104. The alloy sample may be a disk of material to be used as a catalyst in the formation of a polycrystalline diamond compact ("PDC") element (e.g., a so-called "thermally stable" PDC element). In some embodiments, the alloy sample may include a homogenized alloy. The alloy sample may include, for example, an alloy of multiple elemental materials, such as one or more of cobalt, aluminum, nickel, tungsten, and/or carbon. By way of example and not limitation, the alloy sample may include an alloy discussed in U.S. patent application Ser. No. 15/060,911, titled "Polycrystalline Diamond Compacts, Methods Of Forming Polycrystalline Diamond, And Earth-Boring Tools," filed Mar. 4, 2016, the disclosure of which is hereby incorporated by reference.

The array 102A may be sized and shaped to correspond (e.g., approximately match) the size and shape of the alloy sample 120, which may result in a sufficient hold of the alloy sample 120 for processing while reducing a likelihood of introduction of debris (e.g., abrasive slurry, abraded particles) between the alloy sample 120 and the holder 100A. Thus, in some embodiments (e.g., in embodiments for forming samples having a target thickness of about 2 mm or less), when the alloy sample 120 is substantially centered on the array 102A, an outer peripheral extent of the array 102A may exceed (e.g., be larger than) the outer peripheral extent of the alloy sample 120 by a distance $D_2$, as shown in FIG. 9. By way of example and not limitation, the distance $D_2$ by which the outer peripheral extent of the array 102A exceeds the outer peripheral extent of the alloy sample 120 may be at least about 2 mm, at least about 4 mm, or at least about 5 mm. By way of example and not limitation, in embodiments for forming samples having a target thickness of about 2 mm or less, the peripheral outer extent of the array 102A may exceed a peripheral outer extent of the alloy sample 120 to reduce or eliminate a buildup of abrasive material or abraded material between the alloy sample 120 and the sample holder 100A. The reduction or elimination of abrasive material or abraded material building up between the alloy sample 120 and the sample holder 100A may be accomplished by positioning an interface between the magnets 104 (a location where magnetic or ferromagnetic material tends to build up) outside of a periphery of the sample 100A.

Figure 10:
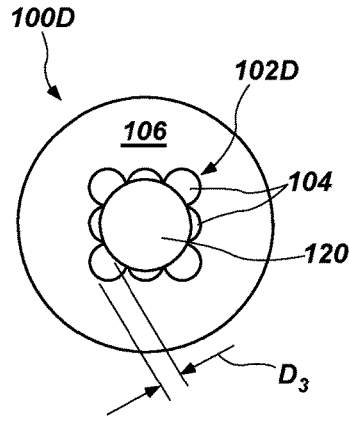
FIG. 10 shows a top view of the magnetic sample holder of FIG. 6 with a sample to be processed.

FIG. 10 illustrates the magnetic sample holder 100D of FIG. 6 with the circular alloy sample 120 magnetically coupled to the square-packed array 102D of magnets 104. Even though the square-packed array 102D may have a generally square shape, the array 102D may be sized and shaped to correspond (e.g., approximately match) the size and shape of the alloy sample 120 (e.g., circular, etc.). Thus, in some embodiments (e.g., in embodiments for forming samples having a target thickness of about 2 mm or less), when the alloy sample 120 is substantially centered on the array 102D, an outer peripheral extent of the array 102D may exceed an outer peripheral extent of the alloy sample 120 by a distance $D_3$, as shown in FIG. 10. By way of example and not limitation, the distance $D_3$ between the outer peripheral extent of the array 102D and the outer peripheral extent of the alloy sample 120 may be at least about 2 mm, at least about 4 mm, or at least about 5 mm.

Similarly, the array 102E of FIG. 7 and the array 102F of FIG. 8 may be configured for holding and processing an elongated sample having a shape and size that corresponds (e.g., approximately matches) to the elongated shape and size of the array 102E or 102F. Arrays 102 having different shapes (e.g., triangular, irregular, semicircular, etc.) may be provided for use with samples having corresponding shapes.

Although FIGS. 7 through 10 illustrate respective arrays 102E, 102F, 102A, 102D that are sized and shaped to correspond to (e.g., approximately match) the size and shape of particular samples, the sample holders 100 of the present disclosure may also be used to hold samples that have sizes and shapes that do not correspond to the array 102 shape and size. For example, when the sample holders 100 are used to hold relatively thick samples (e.g., samples thicker than about 0.25 mm) for a polishing operation, or in applications where precisely controlling TTV is not important, the array 102 can be significantly smaller than the sample, so long as the magnetic coupling force between the array 102 and the sample is sufficient to hold the mass of the sample.

Methods of abrading a sample with a sample holder, which methods can be used for forming (e.g., thinning, grinding, polishing) an alloy element for forming a PDC element, include magnetically securing a ferromagnetic sample (e.g., an alloy sample, a homogenized alloy sample) to an array of magnets embedded in a matrix material. In some embodiments, the sample may be centered over the array, such that a largest distance between an outer peripheral edge of the sample and an outer peripheral edge of the array may be about 5 mm or less. As discussed above, the magnets of the array may be close together. For example, each magnet in the array may be within about 4 mm of (e.g., touching) at least one adjacent magnet of the array. A portion of the sample may be abraded away while the sample is held by the array of magnets embedded in the matrix material. The sample holders may be used in conventional abrasion operations, such as for holding ferromagnetic samples against commercially available disk grinders, polishers, and pads (e.g., diamond polishing pads, diamond lapping pads).

In some embodiments, a substrate on which an abrasive pad and/or an abrasive slurry is positioned may be ferromagnetic, such as a cast iron plate. In such a case, a magnetic field of the magnetic sample holder may magnetically interact with the substrate to clamp the sample between the sample holder and the substrate, providing and maintaining a force between the sample and the abrasive pad and/or abrasive slurry to facilitate the abrasive process.

In some embodiments, the sample may be polished with a diamond lapping film having a grade of 30 μm or less (e.g., 30 μm, 1.0 μm, etc.), although the methods and devices of the present disclosure may also be used for coarser abrasive processes. In some embodiments, a sample may be abraded to an average thickness of between about 0.0025 inch and about 0.025 inch (e.g., about 0.010 inch), although the methods and devices of the present disclosure may also be used for polishing or otherwise abrading thicker samples. A relative flatness of the sample may be between about 13 μin and about 0.1 inch.

After the desired portion of the sample is abraded away, the sample may be magnetically decoupled and removed from the array of magnets. Removal may be accomplished by sliding or peeling the sample from the sample holder. The alloy sample may be positioned proximate diamond grains and subjected to a high pressure/high temperature (HTHP) process, with the alloy sample being used as a catalyst source to sinter the diamond grains, as described in U.S. patent application Ser. No. 15/060,911, titled "Polycrystalline Diamond Compacts, Methods Of Forming Polycrystalline Diamond, And Earth-Boring Tools," filed Mar. 4, 2016, incorporated by reference above.

Figure 11A:
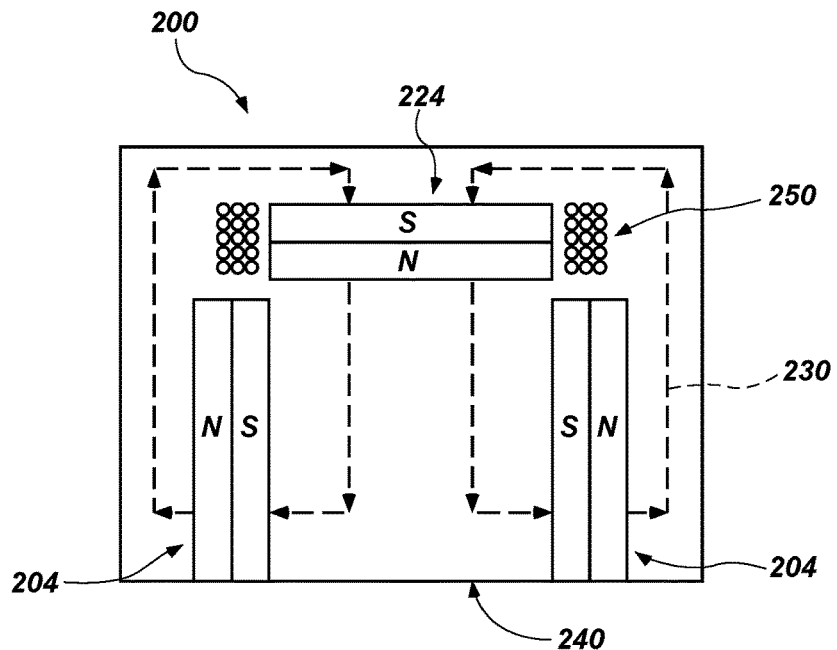
FIGS. 11A and 11B illustrate a schematic side view of a magnetic sample holder that includes an electrically switchable permanent magnet according to an embodiment of the present disclosure.
Figure 11B:
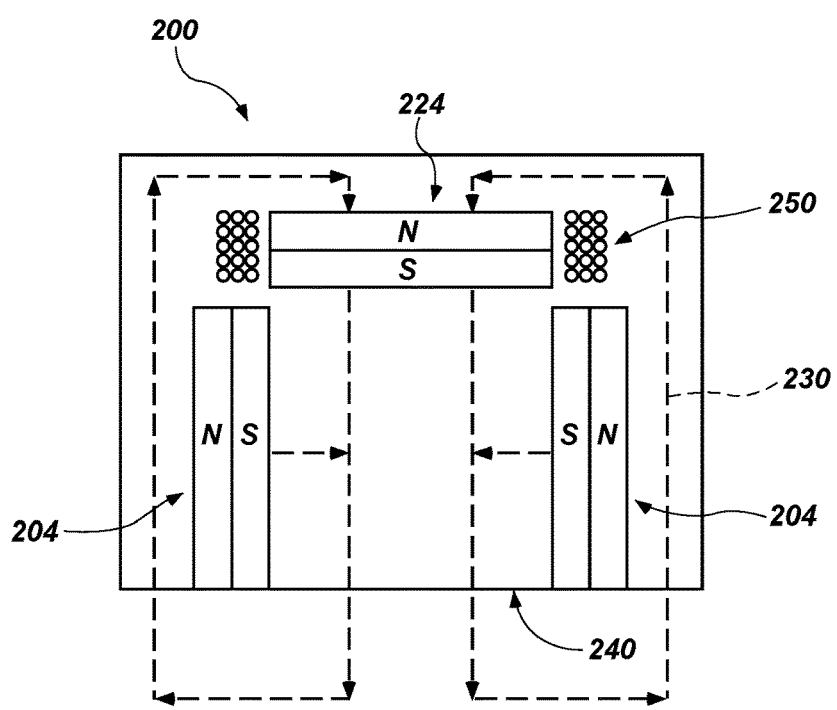

FIGS. 11A and 11B illustrate an embodiment of an electrically switchable magnetic sample holder 200 that employs at least one electrically switchable permanent magnet 224 in conjunction with permanent working magnets 204. FIG. 11A illustrates the electrically switchable magnetic sample holder 200 in an "off" state in which a magnetic field 230 does not extend (or only weakly extends) beyond a working surface 240 of the sample holder 200. Accordingly, a ferromagnetic sample positioned proximate the working surface 240 would not be magnetically coupled to, and consequently not held by, the sample holder 200 in the state shown in FIG. 11A. FIG. 11B illustrates the electrically switchable magnetic sample holder 200 in an "on" state in which the magnetic field 230 does extend beyond the working surface 240 of the sample holder 200. Accordingly, a ferromagnetic sample positioned proximate the working surface 240 would be magnetically coupled to and held by the sample holder 200 in the state shown in FIG. 11B.

Referring to FIG. 11A, the electrically switchable sample holder 200 may include the permanent working magnets 204 positioned proximate to the working surface 240 (e.g., the surface against which a sample is to be held). A group of the working magnets 204 may be positioned such that a common polarity (e.g., the south pole of the working magnets 204, as illustrated in FIGS. 11A and 11B) is directed radially inward. The at least one electrically switchable permanent magnet 224 may be positioned proximate and transverse (e.g., perpendicular) to the group of the working magnets 204, on a side thereof opposite the working surface 240. In the "off" state, the polarity of the at least one electrically switchable permanent magnet 224 opposite to the common inward polarity of the working magnets 204 (e.g., the north pole of the at least one electrically switchable permanent magnet 224) is directed toward a center of the group of working magnets 204 and transverse to the polarity of the working magnets 204. This positioning and polarity of the at least one electrically switchable permanent magnet 224 in relation to the working magnets 204 may maintain the magnetic field 230 away from the working surface 240 (e.g., within the sample holder 200). An electrical switching element 250 (e.g., a wire coil) may be positioned proximate to the at least one electrically switchable permanent magnet 224 for selectively switching the polarity of the at least one electrically switchable permanent magnet 224.

Referring to FIG. 11B, the sample holder 200 is in an "on" state in which the at least one electrically switchable permanent magnet 224 may have a polarity that is switched relative to the "off" state shown in FIG. 11A. A sufficient pulse of electricity having an appropriate voltage may be passed through the electrical switching element 250 to switch the polarity of the at least one electrically switchable permanent magnet 224 from the "off" state (e.g., north-down) shown in FIG. 11A to the "on" state (e.g., south-down) shown in FIG. 11B. In the "on" state (FIG. 11B), the polarity of the at least one electrically switchable permanent magnet 224 may enable the magnetic field 230 to extend beyond the working surface 240 to magnetically couple and hold a ferromagnetic sample to the working surface 240 of the sample holder 200.

By passing a sufficient pulse of electricity having an opposite voltage through the electrical switching element 250, the polarity of the at least one electrically switchable permanent magnet 224 may be switched back from the "on" state (FIG. 11B) to the "off" state (FIG. 11A) for decoupling and releasing a sample from the working surface 240.

Figure 12A:
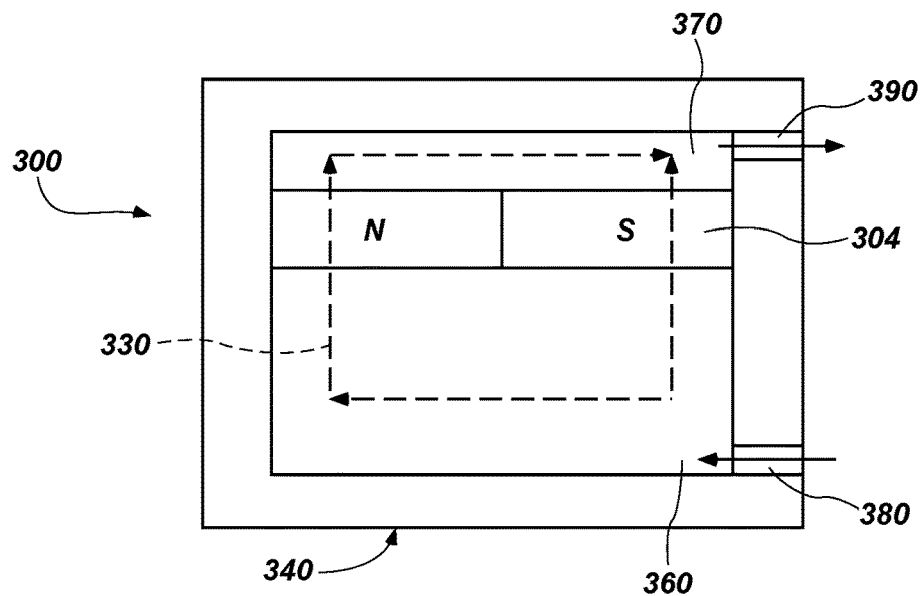
FIGS. 12A and 12B illustrate a schematic side view of a magnetic sample holder that includes a pneumatically switchable permanent magnet according to an embodiment of the present disclosure.
Figure 12B:
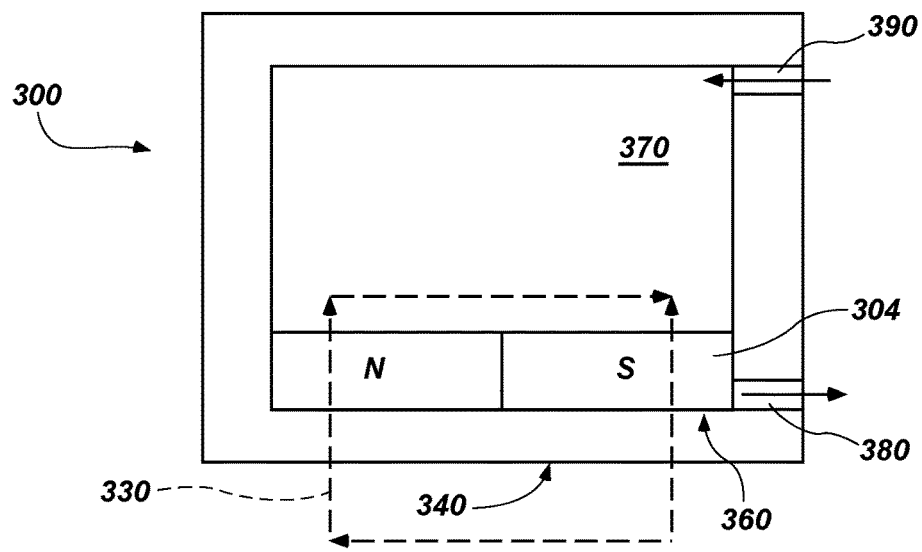

FIGS. 12A and 12B illustrate an embodiment of a pneumatically switchable magnetic sample holder 300 that employs at least one movable permanent magnet 304. FIG. 12A illustrates the pneumatically switchable magnetic sample holder 300 in an "off" state in which a magnetic field 330 does not extend (or only weakly extends) beyond a working surface 340 of the sample holder 300. Accordingly, a ferromagnetic sample positioned proximate the working surface 340 would not be magnetically coupled to, and consequently not held by, the sample holder 300 in the state shown in FIG. 12A. FIG. 12B illustrates the pneumatically switchable magnetic sample holder 300 in an "on" state in which the magnetic field 330 does extend beyond the working surface 340 of the sample holder 300. Accordingly, a ferromagnetic sample positioned proximate the working surface 340 would be magnetically coupled to and held by the sample holder 300 in the state shown in FIG. 12B.

Referring to FIG. 12A, the pneumatically switchable magnetic sample holder 300 may include the magnet 304 acting as a piston between a first fluid cavity 360 proximate the working surface 340 and a second fluid cavity 370. A first fluid port 380 may provide a pathway for pneumatic fluid (e.g., air, water, oil) to flow into and out of the first fluid cavity 360. A second fluid port 390 may provide a pathway for pneumatic fluid (e.g., air, water, oil) to flow into and out of the second fluid cavity 370. In the "off" state shown in FIG. 12A, the magnet 304 may be positioned away from the working surface 340 to maintain the magnetic field 330 away from the working surface (e.g., within the sample holder 300). The magnet 304 may be placed in the "off" position by withdrawing a pneumatic fluid from the second fluid cavity 370 through the second fluid port 390 and/or introducing pneumatic fluid into the first fluid cavity 360 through the first fluid port 380.

To switch the pneumatically switchable magnetic sample holder 300 from the "off" state shown in FIG. 12A to the "on" state shown in FIG. 12B, a pneumatic fluid may be withdrawn from the first fluid cavity 360 through the first fluid port 380 and/or introduced into the second fluid cavity 370 through the second fluid port 390 to move the magnet 304 into a position proximate the working surface 340, as shown in FIG. 12B. In this position, the magnetic field 330 may extend beyond the working surface 340 for magnetically coupling to and holding a ferromagnetic sample against the working surface 340.

To decouple and release a sample from the working surface 340, pneumatic fluid may be introduced into the first fluid cavity 360 and/or withdrawn from the second fluid cavity 370 to move the magnet 304 from a position proximate the working surface 340 (FIG. 12B) to a position away from the working surface 340 (FIG. 12A). In additional embodiments, any device or mechanism (e.g., an electromagnetic solenoid) may be used to move the magnet 304 between the positions shown in FIGS. 12A and 12B.

Figure 13:
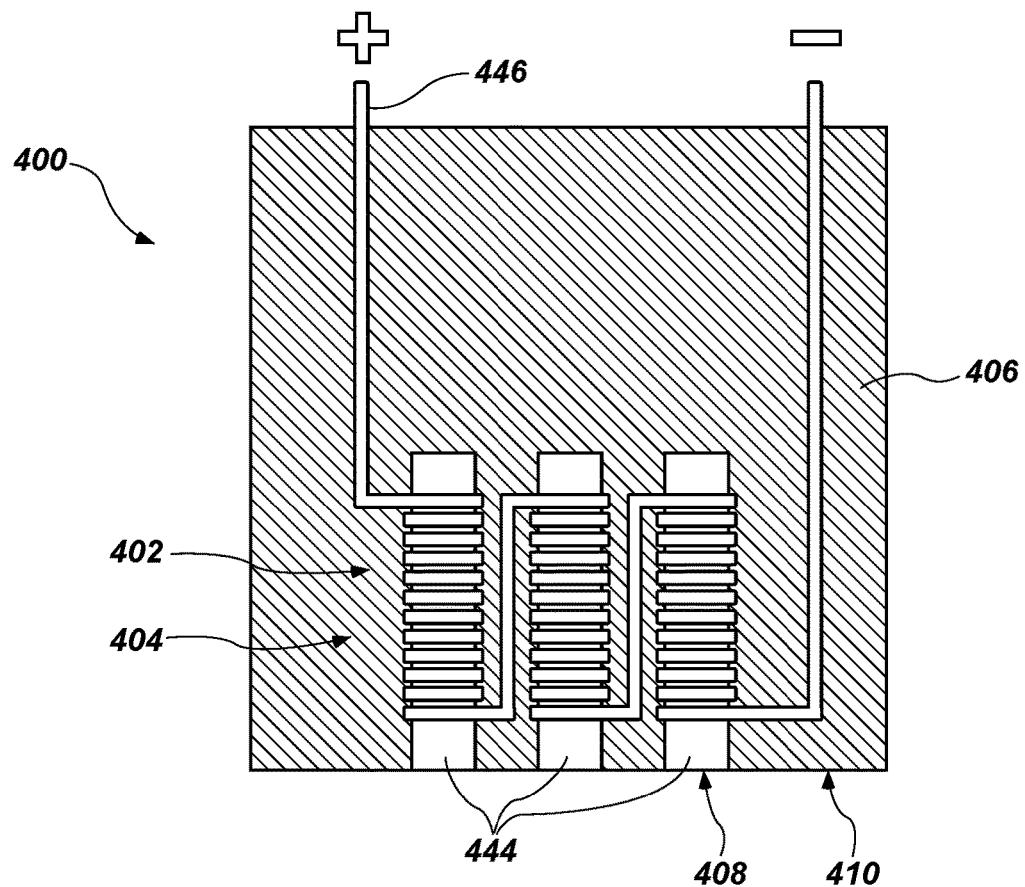
FIG. 13 shows a cross-sectional side view of a magnetic sample holder that includes electromagnets according to an embodiment of the present disclosure.

FIG. 13 illustrates an electromagnetic sample holder 400 according to an embodiment of the disclosure. The electromagnetic sample holder 400 may include an array 402 of electromagnets 404 embedded within a non-ferromagnetic and non-magnetic matrix material 406. As discussed above and shown in FIG. 1, a base structure may optionally be used. Each of the electromagnets 404 may include a ferromagnetic rod 444 around which a conductive wire 446 is coiled. Exposed end surfaces 408 of the ferromagnetic rods 444 may be substantially coplanar with a planar working surface 410 of the matrix material 406. The electromagnetic sample holder 400 may be switched to an "on" state in which the electromagnets 404 create a magnetic field sufficient to hold a ferromagnetic sample against the planar working surface 410 of the matrix material 406 and against the exposed end surfaces 408 of the ferromagnetic rods 444 by passing a sufficient electrical current through the conductive wire 446. When it is desired to decouple and remove a sample from the electromagnetic sample holder 400, electrical current through the conductive wire 446 may be halted or reversed, which may reduce or eliminate a magnetic field produced by the electromagnets 404 or generate a repulsive magnetic force between the sample and the electromagnetic sample holder 400.

The embodiments of the disclosure described above and illustrated in the accompanying drawing figures do not limit the scope of the invention, since these embodiments are merely examples of embodiments of the disclosure. The invention is encompassed by the appended claims and their legal equivalents. Any equivalent embodiments lie within the scope of this disclosure. Indeed, various modifications of the present disclosure, in addition to those shown and described herein, such as other combinations and modifications of the elements described, will become apparent to those of ordinary skill in the art from the description. Such embodiments, combinations, and modifications also fall within the scope of the appended claims and their legal equivalents.

What is claimed is:

1. A magnetic sample holder for an abrasive operation, the magnetic sample holder comprising:
   a base structure defining a cavity on a longitudinal end thereof;
   an array of magnets, each magnet of the array of magnets being positioned from 0 mm to about 4 mm from at least one adjacent magnet of the array of magnets,
   wherein a lower portion of each magnet of the array of magnets is disposed within the cavity of the base structure; and
   a matrix material at least partially surrounding the base structure, upper portions of the array of magnets being embedded in the matrix material,
   wherein exposed surfaces of the magnets of the array of magnets are coplanar with a planar working surface of the matrix material.

2. The magnetic sample holder of claim 1, wherein the array of magnets comprises cylindrical magnets having magnetic flux lines that are positioned parallel to each other.

3. The magnetic sample holder of claim 2, wherein the exposed surface of each magnet of the array of magnets comprises a longitudinal end surface of each magnet.

4. The magnetic sample holder of claim 1, wherein the magnets of the array of magnets are arranged in a hexagonal close-packed configuration.

5. The magnetic sample holder of claim 1, wherein the magnets of the array of magnets are arranged in a square-packed configuration.

6. The magnetic sample holder of claim 1, wherein each magnet of the array of magnets touches at least one adjacent magnet of the array of magnets.

7. The magnetic sample holder of claim 1, wherein each magnet of the array of magnets is no more than about 2 mm from at least one adjacent magnet of the array of magnets.

8. The magnetic sample holder of claim 1, wherein the base structure comprises a different material than the matrix material.

9. The magnetic sample holder of claim 8, wherein a material of the base structure has a first density and the matrix material has a second density that is less than the first density.

10. The magnetic sample holder of claim 1, wherein an outer peripheral shape of the matrix material is substantially cylindrical.

11. The magnetic sample holder of claim 1, wherein the matrix material consists essentially of a non-ferromagnetic, non-magnetic material.

12. The magnetic sample holder of claim 1, wherein the array of magnets comprises an array of permanent magnets.

13. The magnetic sample holder of claim 1, wherein an outer peripheral extent of the array of magnets is shaped and sized to exceed an outer peripheral extent of a ferromagnetic sample to be held by the magnetic sample holder.

14. A magnetic sample holder for an abrasive operation, the magnetic sample holder comprising:

a base structure comprising a non-magnetic material, the base structure having a first density and defining a cavity on a longitudinal end thereof;

an array of magnets positioned over the base structure, each magnet of the array of magnets being cylindrical, each magnet positioned within about 4 mm of at least two adjacent magnets of the array, and each magnet having magnetic flux lines that are parallel to magnetic flux lines of all other magnets of the array, wherein a lower portion of each magnet of the array of magnets is disposed within the cavity of the base structure; and a matrix material at least partially surrounding the base structure and comprising a non-magnetic and non-ferromagnetic material in which upper portions of the array of magnets are embedded, the matrix material having a second density less than the first density, wherein exposed surfaces of each magnet of the array are substantially coplanar with a planar working surface of the matrix material.

15. A method of forming a polycrystalline diamond compact element, the method comprising:

providing a base structure defining a cavity on a longitudinal end thereof;

providing an array of magnets, each magnet of the array of magnets being positioned from 0 mm to about 4 mm from at least one adjacent magnet of the array of magnets, wherein a lower portion of each magnet of the array of magnets is disposed within the cavity of the base structure;

providing a matrix material at least partially surrounding the base structure, upper portions of the array of magnets being embedded in the matrix material;

wherein exposed surfaces of the magnets of the array of magnets are coplanar with a planar working surface of the matrix material;

magnetically securing an alloy sample to the array of magnets;

abrading away a portion of the alloy sample while holding the alloy sample with the array of magnets;

magnetically decoupling the alloy sample from the array of magnets;

positioning the alloy sample proximate diamond grains and a substrate; and subjecting the alloy sample, diamond grains, and substrate to a high pressure/high temperature process to sinter the diamond grains.

16. The method of claim 15, wherein abrading away the portion of the alloy sample comprises polishing a surface of the alloy sample with a diamond lapping film having a grade of about 30 µm or less.

17. The method of claim 15, wherein abrading away the portion of the alloy sample is performed until the alloy sample has a thickness of between about 0.0025 inch to about 0.025 inch.

18. The method of claim 15, wherein magnetically securing the alloy sample to the array of magnets comprises centering the alloy sample over the array of magnets.

19. The method of claim 15 wherein abrading away the portion of the alloy sample comprises polishing the alloy sample with a loose diamond material.

* * * * *